United States Patent
Loveland et al.

[15] 3,704,041
[45] Nov. 28, 1972

[54] APPARATUS FOR FEEDING CONVEYOR FROM BULK SUPPLY

[72] Inventors: Malcolm W. Loveland, Orinda; Robert J. Singleton, Pittsburg, both of Calif.

[73] Assignee: Atlas Pacific Engineering Company

[22] Filed: Dec. 21, 1970

[21] Appl. No.: 100,143

[52] U.S. Cl..................................302/14, 137/575
[51] Int. Cl..............................................B65g 53/30
[58] Field of Search............302/14, 15, 16; 137/575; 198/33 AA

[56] References Cited

UNITED STATES PATENTS

| | | | |
|---|---|---|---|
| 2,572,773 | 10/1951 | Slagle | 198/33 AA |
| 2,287,396 | 6/1942 | Roth | 137/575 X |
| 3,306,320 | 2/1967 | Bond | 137/575 X |
| 3,215,238 | 11/1965 | Ackermann | 302/16 X |

Primary Examiner—Richard E. Aegerter
Assistant Examiner—H. S. Lane
Attorney—Carl Hoppe et al.

[57] ABSTRACT

An apparatus for containing a bulk supply of fruit and arranged for feeding fruit one at a time onto a conveyor from the bulk supply using a liquid to support and carry the fruit onto the conveyor and more particularly characterized in the use of a pair of tanks, one tank being employed to support the fruit in liquid and a second tank for storing the liquid displaced by the entry of fruit, said tanks being interconnected by an overflow water passage, a water return having an intake located subjacent to the conveyor, and means for pumping water from the water storage tank back into the fruit containing tank at a point remote from the intake of the water return.

9 Claims, 7 Drawing Figures

PATENTED NOV 28 1972 3,704,041

INVENTORS
MALCOLM W. LOVELAND
BY ROBERT J. SINGLETON

Eckhoff & Hoppe

ATTORNEYS

INVENTORS
MALCOLM W. LOVELAND
BY ROBERT J. SINGLETON

Eckhoff & Hopper
ATTORNEYS

APPARATUS FOR FEEDING CONVEYOR FROM BULK SUPPLY

This invention relates to apparatus for feeding fruit from a bulk supply and depositing pieces of fruit onto a conveyor one at a time. It more particularly involves a type of apparatus that generates a fluid flow to carry the fruit from a bulk supply into a pick up station through which a conveyor passes. Apparatus of this general type is, of course, known.

It is, therefore, one object of the present invention to provide an improved feeder apparatus that has greater flexibility and compactness than known apparatus. In that regard, the present invention provides a feeder that may be adjusted for feeding size-graded fruit or orchard run fruit to a conveyor with unusually good efficiency as determined by the number of pieces of fruit picked up by the conveyor.

It is another object of the present invention to provide a feeder having a hydraulic system which will feed single pieces of fruit to a conveyor without the clogging of the system by leaves or other debris.

A still further object is to provide a feeder having a hydraulic system in which the fluid level within a feeder tank is maintained for various amounts of fruit on hand and which tolerates the addition of more fruit to the system without affecting the rate or quality of feeding the fruit pieces.

Other objects of this invention will become apparent in view of the following detailed description.

In the drawings forming a part of this application and in which like parts are identified by like reference numerals throughout the same, FIG. 1 is a perspective view of a preferred embodiment of the invention in feeder apparatus;

Figure 1:
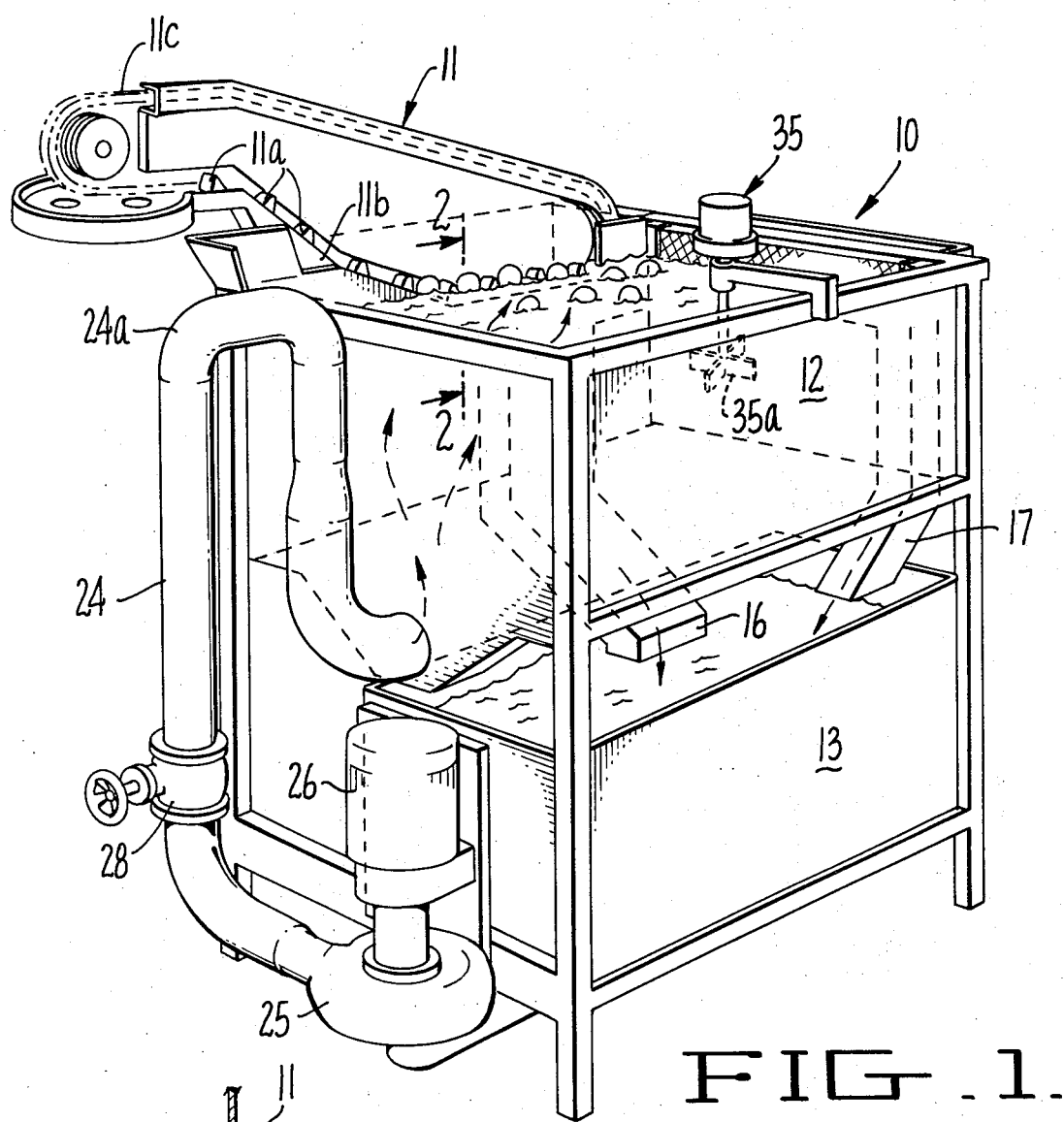
Figure 2:
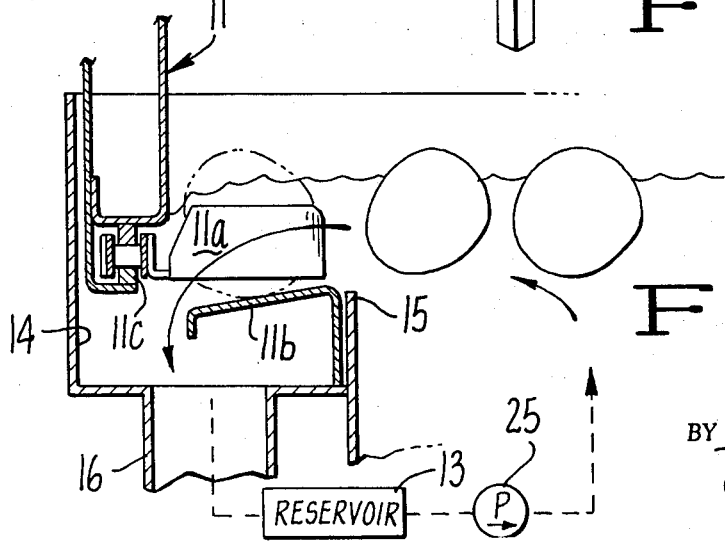
FIG. 2 is an enlarged partial section taken on lines 2—2 of FIG. 1 and including a schematic of the fluid recycling system.
Figure 3:
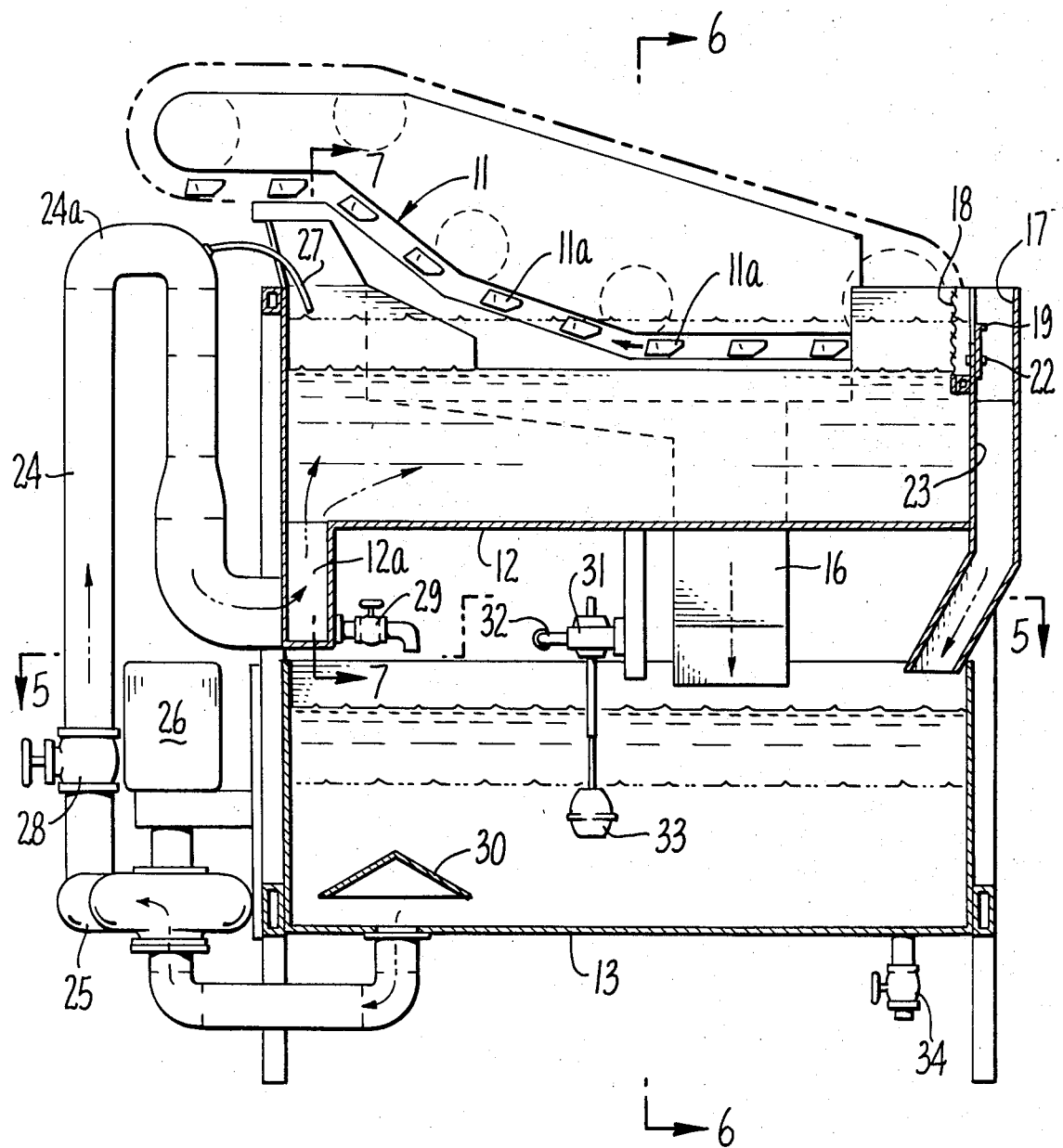
FIG. 3 is a side elevation of the apparatus.

Referring to FIG. 1 in particular, there is illustrated a preferred embodiment in an apparatus 10 for feeding pieces of fruit, such as apples, onto a conveyor 11, depositing pieces of fruit into pockets between the lugs 11a which move above a shelf 11b. Conveyor 11 is of a lug chain construction and forms no part of the present invention. A suitable conveyor for use with the invention is illustrated and described in U.S. Pat. No. 3,499,687.

Feeder 10 essentially comprises a pair of upper and lower tanks 12 and 13. Tank 12 is normally filled with water to a predetermined level and serves to hold a bulk supply of fruit and float the pieces of fruit onto the lugs 11a of conveyor 11. Tank 12 is more especially constructed with an elongate trough or reservoir 14 that extends along one side of the tank, and the water within tank 12 is maintained at a minimum level by a weir 15. Carrier liquid or water from tank 12 passes over the weir 15 while carrying the fruit into pockets between lugs of the chain 11c. The water then gravitates through the water return 16 discharging back into tank 13 which serves as a water storage tank or reservoir.

One end of tank 12 is formed with an overflow water passage 17 having a water inlet that is guarded by a screen 18. The lower edge of the inlet to passage 17 is defined by a vertically adjustable weir 19. A pair of vertically elongated slots 20 and 21 formed in weir 19 receive mounting bolts 22 for fastening the weir to a support plate 23 which defines an inside surface of passage 17. In operation, weir 19 is vertically adjusted to maintain a selected maximum water level within tank 12 for transporting a certain size of apple onto conveyor 11. The height of weir 19 may be changed for greatest efficiency of operation when other sizes of apples are to be processed.

It will be noted that weir 19 extends a considerable width across tank 12, and the capacity of return passage 17 is relatively large. This construction permits the water to escape rapidly and allows a large bulk volume of apples or other fruit to be deposited into tank 12 in a short period of time without causing a significant rise in the water level. The main purpose of the overflow is to maintain an efficient water level at all times. An exceptionally high water level could impair the fruit feeding operation.

Figure 4:
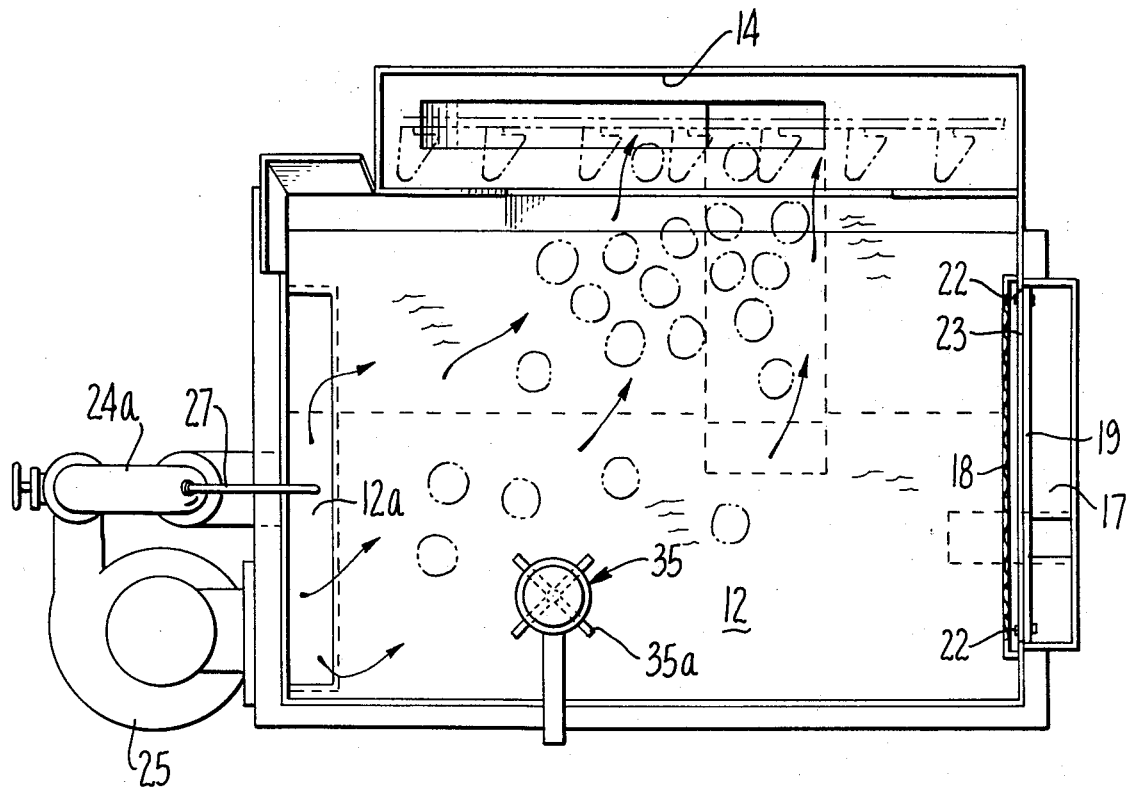
FIG. 4 is a plan view of the feeder apparatus.
Figure 5:
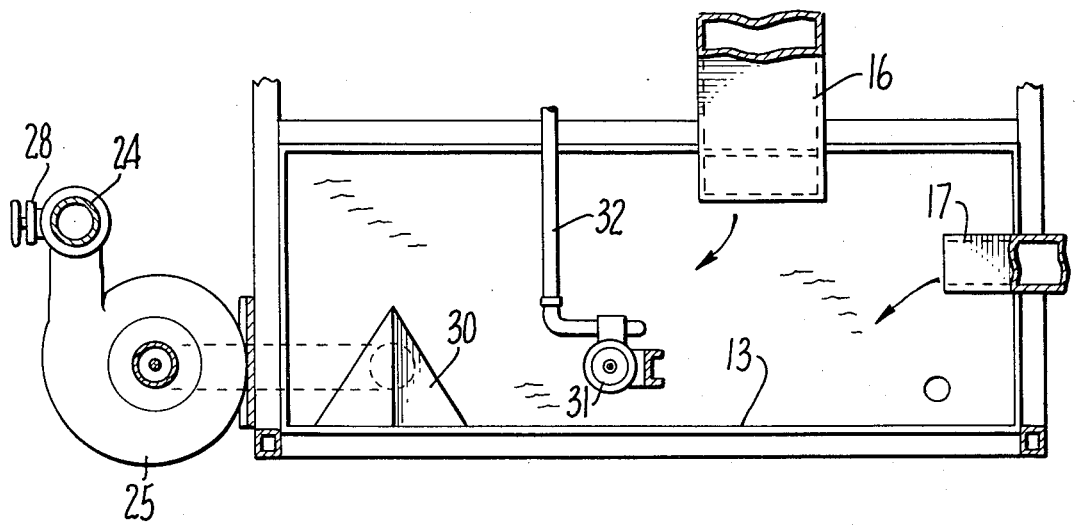
FIG. 5 is a plan view and partial section as viewed on broken lines 5—5 of FIG. 3.
Figure 6:
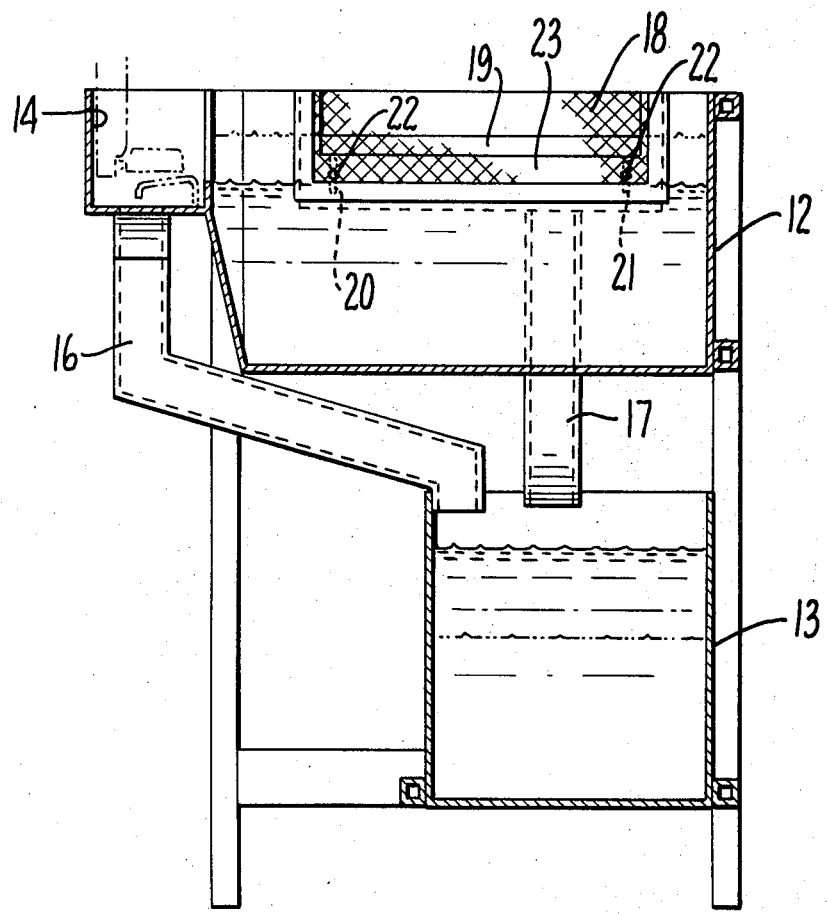
FIG. 6 is a vertical section taken on the lines 6—6 of FIG. 3.
Figure 7:
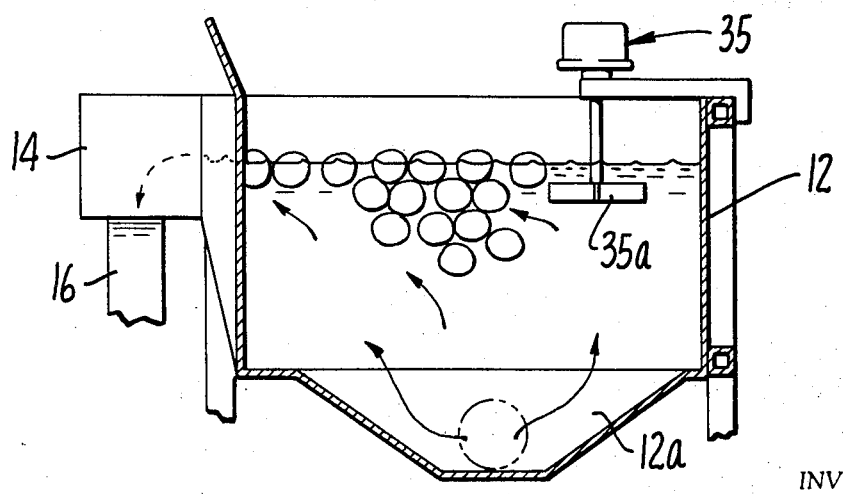
FIG. 7 is a vertical section taken on the lines 7—7 of FIG. 3.

Means is further provided for recycling water from water storage tank 13 back into fruit containing tank 12, this for the purpose of causing the fruit to enter the conveyor pockets. Such means comprises a fluid connection 24 and a hydraulic pump 25 driven by a motor 26. Fluid connection 24 includes an elbow or section 24a that is above the highest operating level for water in tank 12, and one end of an anti-siphon tube 27 fluidly connects to section 24a. The other end of tube 27 overhangs tank 12, discharging a small quantity of liquid into said tank while pump 25 is operating. Fluid connection 24 otherwise discharges a much greater quanity of liquid into a compartment 12a which forms a lower part of tank 12, the discharged liquid being dispersed within the trough before passing upward and flowing out of the tank through either water return 16 or overflow passage 17. The primary purpose of anti-siphon tube 27 is to prevent the siphoning of water from tank 12 back through fluid connection 24 into tank 13 as would occur if pump 25 is stopped. During normal operation, the liquid that enters tank 12 moves diagonally from bottom to top of the tank in the direction indicated by arrows in FIG. 4. This directed flow of the liquid tends to elevate and agitate the floating pieces of fruit while simultaneously moving them in the direction of trough 14 and conveyor 11.

A valve 28 connected on the discharge end of pump 25 provides means for throttling the flow of water returned to tank 12. The opening of valve 28 is set so that the water flow leaving tank 12 through return 16 is balanced with that recycled through connection 24, and the water that passes through passage 17 will be that excess water caused by introducing additional fruit into tank 12.

A drain valve 29 connects with the lower compartment 12a of tank 12 for draining all liquid from that tank into water reservoir tank 13.

Tank 13 has a capacity which is at least sufficient to hold a volume of water as great as the maximum volume of fruit which can be received and accommodated in tank 12 at one time. In addition, the shape and size of tank 13 must be such that it will maintain a depth of liquid so that the suction of pump 25 will not draw air. A baffle 30 positioned over the outlet from tank 13 tends to discourage or inhibit the formation of a vortex. In addition, a float valve 31 maintains the minimum water required for continuous operation and to replenish the small amount of water removed with pieces of fruit on the conveyor. Valve 31 connects to a water supply line 32 and is opened and closed by a float control 33.

A drain valve 34 is provided at the bottom of tank 13 for draining the system when apparatus 10 is to be deactivated.

The above described apparatus is intended to operate continuously. This necessitates that pieces of fruit be introduced into tank 12 either on a continuous or periodic basis. In a preferred operation, apparatus 10 is designed to hold several minutes' supply of fruit and be fed periodically from an external source (not shown). Information that tank 12 is full of fruit, or sufficiently supplied, is obtained with a sensor 35 having a slowly rotating paddle 35a. When the paddle encounters fruit, its rotation is stopped and a switch shuts off the feed source. Controlling units or sensors of this type are conventionally known and form no part of the present invention. But in order to prevent a too frequent action and feed of fruit, it has been found desirable to incorporate a time delay relay in the detector circuit so that a certain time interval may be required before the feed conveyor again operates. The time interval is selected so that there is no reduction in feeding efficiency.

The apparatus shown and described has particular utility in the processing of apples. In such applications it has been found that the depth of tank 12 should be made in excess of the maximum practical depth of apples floating in water. This maximum depth has been determined to be approximately one foot. A deeper stack of apples tends to lock into an unwieldly solid mass and the upper layer of apples will be so high that it is no longer floating. Accordingly, tank 12 is constructed with a depth slightly in excess of one foot and the apples are fed at a rate so that the upper layer is at least partially floating in the water.

Although a preferred embodiment of this invention has been illustrated and described and particular details of construction have been related to the processing of apples, various modifications and changes may be resorted to without departing from the spirit of the invention or the scope of the attached claims, and each of such modifications and changes is contemplated.

What is claimed is:

1. Apparatus for feeding fruit onto a conveyor, comprising a first tank to hold fruit floated in water in said tank and having opposite ends and opposite sides, a water storage tank below said first tank; a water inlet opening at one end of said first tank at the bottom thereof, conduit means connected with said water inlet opening and with said storage tank, pump means in said conduit means for pumping water from said storage tank through said conduit means to said first tank, an adjustable overflow water passage in the other end of said first tank interconnecting said first tank with said water storage tank to maintain a maximum water level in said first tank, a separate fruit pick-up reservoir at one side of and in communication with said first tank over a weir, a water return interconnecting said reservoir with said water storage tank, a conveyor means in said reservoir and including an upwardly extending portion at approximately the level of water in said reservoir for engaging the floating fruit and conveying it upwardly and away from said reservoir, said inlet, said water return and said overflow positioned relative to said reservoir and conveyor means so as to result in a circulation of water in said first tank toward and through said reservoir and past said conveyor means to cause said fruit floated in said first tank to move toward and into engagement with said conveyor means.

2. The apparatus of claim 1, and further comprising valve means for draining water from said first tank into said water storage tank.

3. The apparatus of claim 1, wherein the capacity of said water storage tank is sufficient to receive and hold the water equivalent to the maximum volume of fruit which may be deposited into the first tank at one time and to hold sufficient additional water to operate the apparatus by recycling water with no fruit in said first tank.

4. The apparatus of claim 1, said first tank having means to sense the presence of fruit therein so that the influx of fruit can be controlled so that the upper layer of fruit is at least partially floating in water.

5. The apparatus of claim 1, and further comprising means for maintaining a predetermined quantity of water in the system by adding water to compensate for water losses.

6. The apparatus of claim 1, said first tank being superposed relative to said water storage tank, water gravitating from said first tank to said water storage tank through said overflow water passage and water return, said overflow water passage having a water inlet at least partially defined by a vertically adjustable barrier that may be selectively positioned to control the level of water above the intake of said water return.

7. Apparatus as in claim 1, wherein said water inlet opening extends across a major portion of the width of said one end of said first tank, and said overflow passage in the other end of said first tank extends across substantially the entire width of the other end of the first tank.

8. Apparatus as in claim 1, wherein the conduit means is connected with the water storage tank adjacent the bottom thereof, said pump means being connected in said conduit means adjacent said water storage tanks, and said conduit means extending upwardly from said pump means to an elevation above the top of the first tank and then downwardly to the inlet opening in the bottom of the first tank, and anti-siphan means in the upper most portion of said conduit means.

9. Apparatus as in claim 1, wherein said reservoir is disposed externally of said first tank and said weir is in said one side of said first tank.

* * * * *